US009014657B2

(12) United States Patent
Rohde et al.

(10) Patent No.: US 9,014,657 B2
(45) Date of Patent: Apr. 21, 2015

(54) METHOD AND APPARATUS FOR CREATING EMERGENCY SOCIAL NETWORK

(75) Inventors: Gregory L. Rohde, Washington, DC (US); Francisco Rojo Ortiz, Murcia (ES); Carla Ann Anderson, Center, ND (US); Bengt Simon, Madrid (ES); Ernest Jozef Edgar Berkhout, Murcia (ES)

(73) Assignee: Fress Emergency Service, S.L., Murcia (ES)

( * ) Notice: Subject to any disclaimer, the term of this patent is extended or adjusted under 35 U.S.C. 154(b) by 287 days.

(21) Appl. No.: 13/593,286

(22) Filed: Aug. 23, 2012

(65) Prior Publication Data

US 2013/0052982 A1    Feb. 28, 2013

Related U.S. Application Data

(60) Provisional application No. 61/526,949, filed on Aug. 24, 2011.

(51) Int. Cl.

| H04M 11/00 | (2006.01) |
|---|---|
| H04W 4/20 | (2009.01) |
| H04W 4/22 | (2009.01) |
| H04W 76/00 | (2009.01) |
| G06Q 50/00 | (2012.01) |
| H04M 1/725 | (2006.01) |
| H04M 3/51 | (2006.01) |
| H04M 7/00 | (2006.01) |
| H04W 8/18 | (2009.01) |

(52) U.S. Cl.
CPC ............... *H04W 4/206* (2013.01); *H04W 4/22* (2013.01); *H04W 76/007* (2013.01); *G06Q 50/01* (2013.01); *H04M 1/72541* (2013.01); *H04M 2250/22* (2013.01); *H04W 76/002* (2013.01); *H04M 3/5116* (2013.01); *H04M 7/0024* (2013.01); *H04W 8/186* (2013.01); *H04M 2203/655* (2013.01)

(58) Field of Classification Search
CPC ....... H04W 4/22; H04W 76/007; H04W 4/12; H04W 4/206; H04W 76/002; H04W 8/186; H04M 3/5116; H04M 2203/655; H04M 2207/206; H04M 2242/04; G08B 25/016
USPC ............................................. 455/521, 404.1
See application file for complete search history.

(56) References Cited

U.S. PATENT DOCUMENTS

| 2006/0223562 A1* | 10/2006 | Mathis ......................... 455/518 |
| 2011/0086607 A1* | 4/2011 | Wang et al. ................. 455/404.1 |
| 2011/0111728 A1* | 5/2011 | Ferguson et al. ........... 455/404.2 |

* cited by examiner

*Primary Examiner* — Kwasi Karikari
*Assistant Examiner* — Edward Zhang
(74) *Attorney, Agent, or Firm* — Michael P. Fortkort, Esq.; Michael P Fortkort PC

(57) ABSTRACT

A mobile application for execution on a handheld computing device stores data regarding connections to public safety answering points with which to share information in an emergency situation and establishes connections with an appropriate public safety answering point upon activation of an emergency button, wherein the connections include voice, text, image and video connections. A user is able to create a list of contacts for a private social emergency response network with which to send previously stored private information in an emergency. In an emergency, the mobile application establishes a platform via which the user and those on the private social emergency response network can share information. The mobile application also sends previously stored private information to those on the list during an emergency.

19 Claims, 13 Drawing Sheets

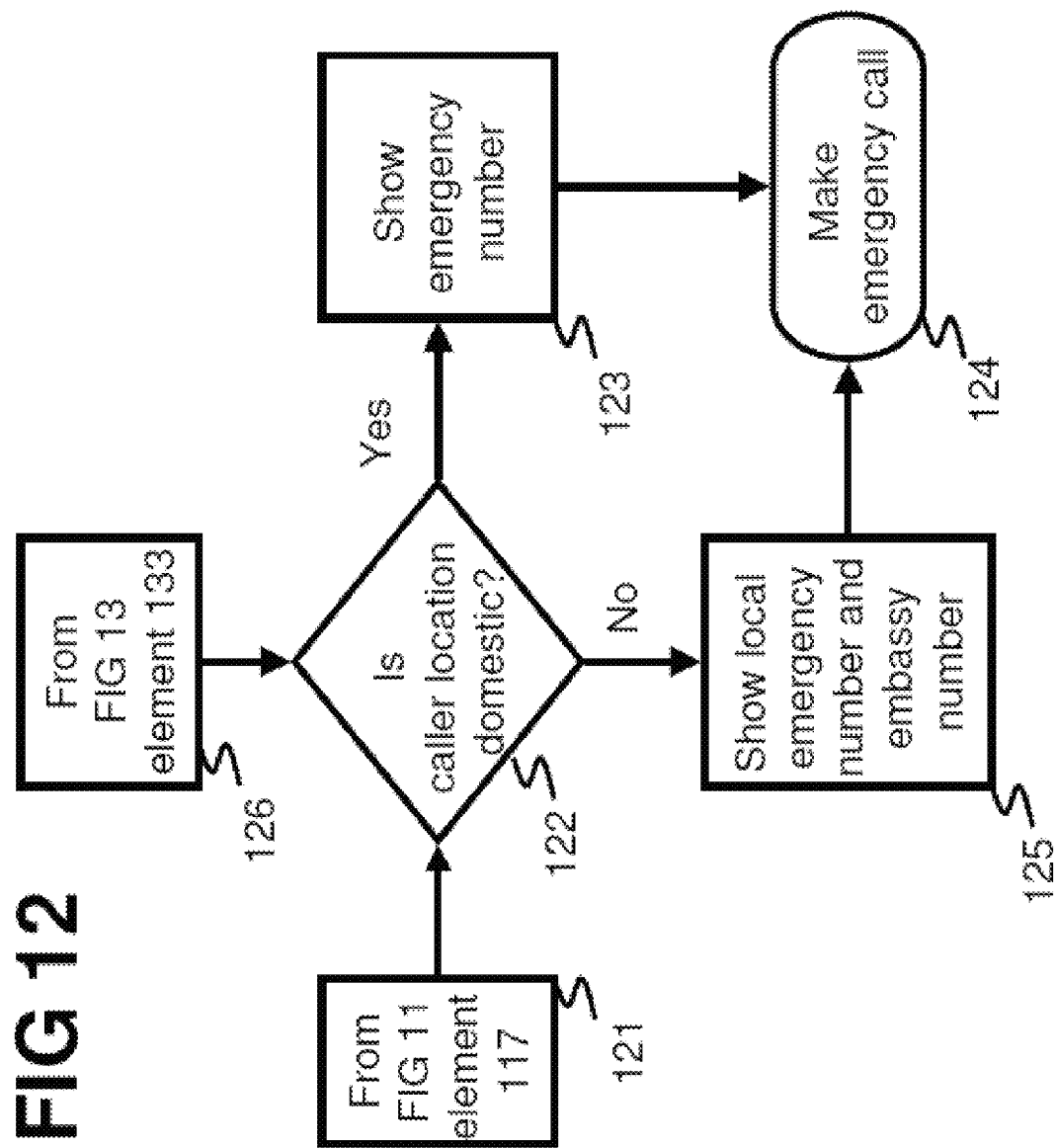

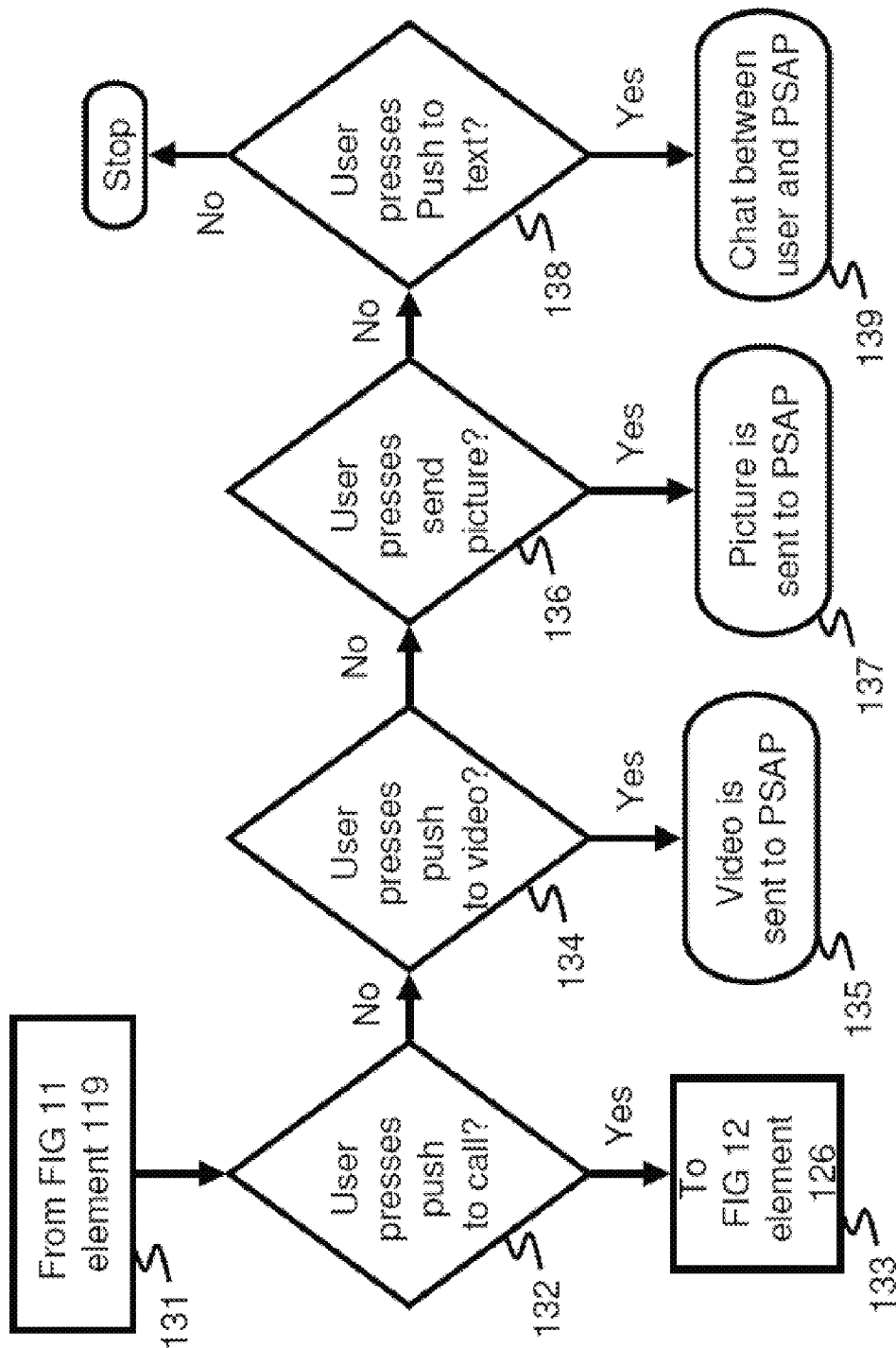

METHOD AND APPARATUS FOR CREATING EMERGENCY SOCIAL NETWORK

RELATED APPLICATIONS

This application claims priority to U.S. Provisional Patent Application No. 61/526,949 filed Aug. 24, 2011 by the same inventors and bearing the same title as the present application, which is hereby incorporated by reference as if repeated herein in its entirety, including the drawings.

BACKGROUND

The present invention relates generally to communications systems and more particularly to a communication system for connecting people to emergency services, responders and service providers, friends and family.

Existing emergency call centers provide insufficient services for many special needs citizens. There exists no simple means to access emergency call centers that uses the full capability of existing technology that provides access to these call centers beyond a "voice-only" communication. A need exists as well for public safety authorities to receive and share information with citizens in a crisis or between and among first responder personnel.

SUMMARY OF THE INVENTION

The present invention solves these and other problems by providing a method and apparatus for creating a social network for emergency response situations. The present invention combines the power of social networks with the simplicity of a mobile application (App) suitable for execution on a handheld computing device to provide individuals and enterprises with easy, immediate access to the necessary answering points to share information in an emergency or accident.

The present invention provides an easy to use application on any smart phone or other similar device, including tablets, thereby enabling any individual to connect with the nearest Public Safety Answering Point (PSAP) via voice, text, image or video communication.

In addition, the present invention allows individuals to create a customized private social emergency response network (e.g., doctor or health care provider or group) and personal emergency response network (e.g., family and friends).

Moreover, the present invention provides a powerful solution for enterprise needs such as telematics, health care, home or office security firms, as well as any non 9-1-1 (or 112/999/066 etc.) call center or command and control center, and a wide range of other security and response needs. The present invention accomplishes the aforesaid by creating an emergency response social network, customized by the individual or enterprise and the PSAP based on their capability, which establishes a platform for the individuals and enterprises to communicate using a wide range of next generation applications. The present invention can direct calls or transfer of text, images, or video to any call center.

The social network of the present invention provides a free communication platform between individuals and emergency call centers (911/112/999/066 or whatever the local emergency call number is, anywhere on the globe) enabling a full range of communications options, including texting, sharing photos, live video transfers and video calls, and voice communications services made possible by a smart phone or other similar handheld computing device.

The service of the present invention does not require any new terminal costs—only a broadband, Internet or wireless connection between the PSAP and the citizen's smart phone or other similar handheld computing device is required.

The present invention provides a flexible platform and allows the citizen to customize what personal information they desire to be shared in the case of an emergency and well as to whom to notify in case of an emergency. The present invention also allows the PSAP to customize the form and nature of the communications the PSAP is prepared to receive from a citizen in an emergency situation, as well as allowing the PSAP to transfer information to first responders or other emergency organizations or personnel in a real time basis.

The present invention includes an Application (App) that may be downloaded on any smart phone, other similar handheld computing/communication device and any computer. The App of the present invention provides the exact location of the citizen who requests help by calling, texting, or initiating a video communication. The citizen's location is received by the PSAP over whatever mapping system the PSAP is using.

In addition to a free service connecting the individual citizen with the emergency call center closest to their location, the platform of the present invention provides citizens and enterprises with a powerful tool to address a wide range of emergency response needs that connect individuals with their health care practitioner, health insurance provider, security services, as well as family, friends, coworkers and neighbors. These applications are available at minimal cost and can be tailored to suit the specific need of the consumer or enterprise using the platform of the present invention. The Emergency Social Network of the present invention provides enterprises providing health care, security, or telematics services with a powerful tool to communicate with customers, insurance companies, patients, and local authorities to share information in an incident.

The present invention includes a service that addresses one of the most critically needed solutions for citizens and public safety authorities—create an immediate solution to launch next generation emergency call communication capabilities.

The need exists for a simple means to access emergency call centers that uses the full capability of existing technology which will provide access beyond a "voice-only" communication. At the same time, public safety authorities require the same capabilities to receive and share information with citizens in a crisis or between first responder personnel.

Additionally, the present invention includes a wide range of revenue apps that address everyday consumer needs to connect with family, friends, and neighbors and enhance communication with health care, security, and insurance services. The present invention offers a wide range of enterprise solutions for organizations and businesses, security, safety, and protection sectors.

The present invention provides a unique social media. Providing a social network for emergency services, the present invention provides a solution to a basic human need that can be greatly enhanced with existing technology.

FRESS has the capability of "reverse" emergency broadcast alerts. The emergency broadcast alerts can be done over Bluetooth and/or WiFi through FRESS enabled devices as well all other devices (or selected phones) that have WiFi or Bluetooth enabled. The emergency broadcast alert can be sent to selected phones based on location or category of user (e.g., sent only to police with registered phone numbers).

The FRESS solution combines "call-in" and "emergency broadcast alerts," hybrid location technology and algorithms;

text, photos and videos; automatic language translation; unique routing capabilities; and cloud capabilities.

BRIEF DESCRIPTION OF THE DRAWINGS

FIGS. 11-13 depict a block diagram of an exemplary embodiment of another method operating in accordance with yet another aspect of the present invention.

DETAILED DESCRIPTION

Figure 1:
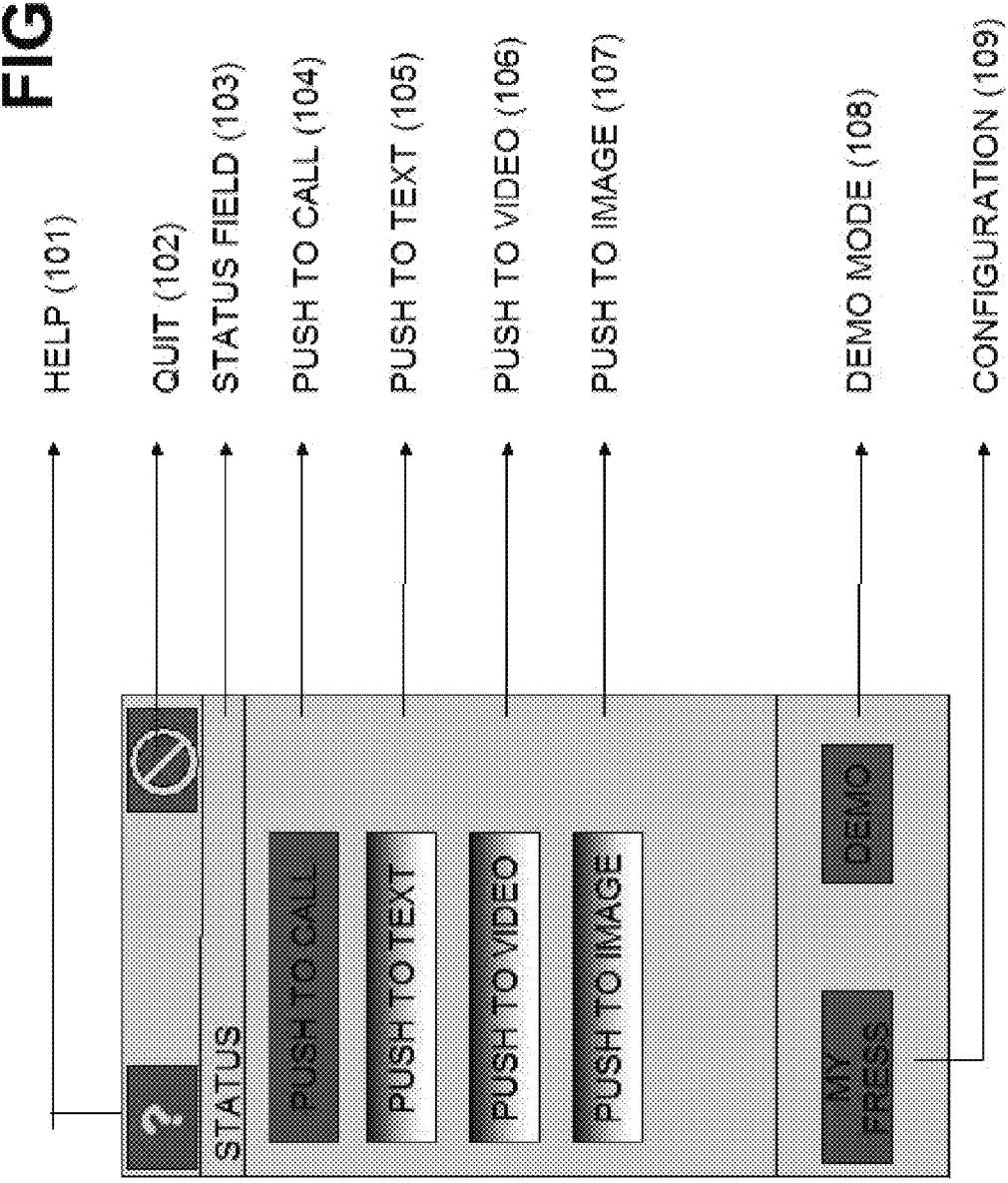
FIG. 1 depicts an exemplary embodiment of a user interface screen on a mobile telephone, smart phone, or other similar communication device, including tablets, according to one aspect of the present invention.

FIG. 1 depicts an exemplary embodiment of a user interface screen on a mobile telephone, smart phone, or other similar handheld computing/communication device according to one aspect of the present invention. The invention described herein may be employed on any portable or standalone computing device, such as an IPAD, IPOD, cell phone, smart phone, mobile communication device, personal assistant, mobile computing device, personal computer, Internet enabled appliance, website interface device, tablet PC, user interface to computing device, etc., but is especially useful for use in a mobile telephone device.

Referring to FIG. 1, upon pressing the HELP button 101 the user is transferred into HELP menu in the user's native language specified in MY FRESS or by the phones DEFAULT LANGUAGE. As used herein, FRESS refers to the mobile App executing on a smart phone, for example.

By pushing the QUIT button 102 the FRESS application will QUIT. A warning message will pop-up asking the user to confirm that he wants to QUIT the App. In any case, the App will leave a back-door open for the PSAP to re-establish the connection for 30 minutes. However, all other services in the App will be deactivated, unless the PSAP wants to re-establish them. This enables the PSAP to communicate with the smart phone if the user becomes unable to do so.

This STATUS FIELD 103 shows the connection status, such as: "Waiting for location . . . "; "Establish connection, please wait"; "Connected to FRESS"; "No FRESS at your location"; etc. In case "connection" is lost by the carrier—the App will automatically try to re-connect. First, second and third time immediately, then five times with five second intervals, and after that five times with ten second intervals and after that every thirty seconds. Other numbers of times and intervals may be employed without departing from the scope of the present invention.

By pushing the PUSH TO CALL (PUSH TO TALK) Button 104 the application will automatically connect the user to his closest PSAP. A local database on the phone maintains records of all emergency numbers in the world. Button 104 will be automatically configured to speed-dial the correct number by the location of the device. In case the device is in a location where there is no single emergency number and/or the user has configured a PRIVATE/PERSONAL PSAP and/or the phone detects the user is not in his home country—then the application will give the user options where to call. For example, in an area with no single emergency number, one possible option comprises Police, Fire or EMS. In case of PRIVATE/PERSONAL PSAP, the options will be the PUBLIC PSAP in addition to the options configured in PRIVATE/PERSONAL PSAP. In case the device detects that the user is not in his home country, the option includes the embassy for the user's specified country. These possible options can be separate or combined.

Figure 2:
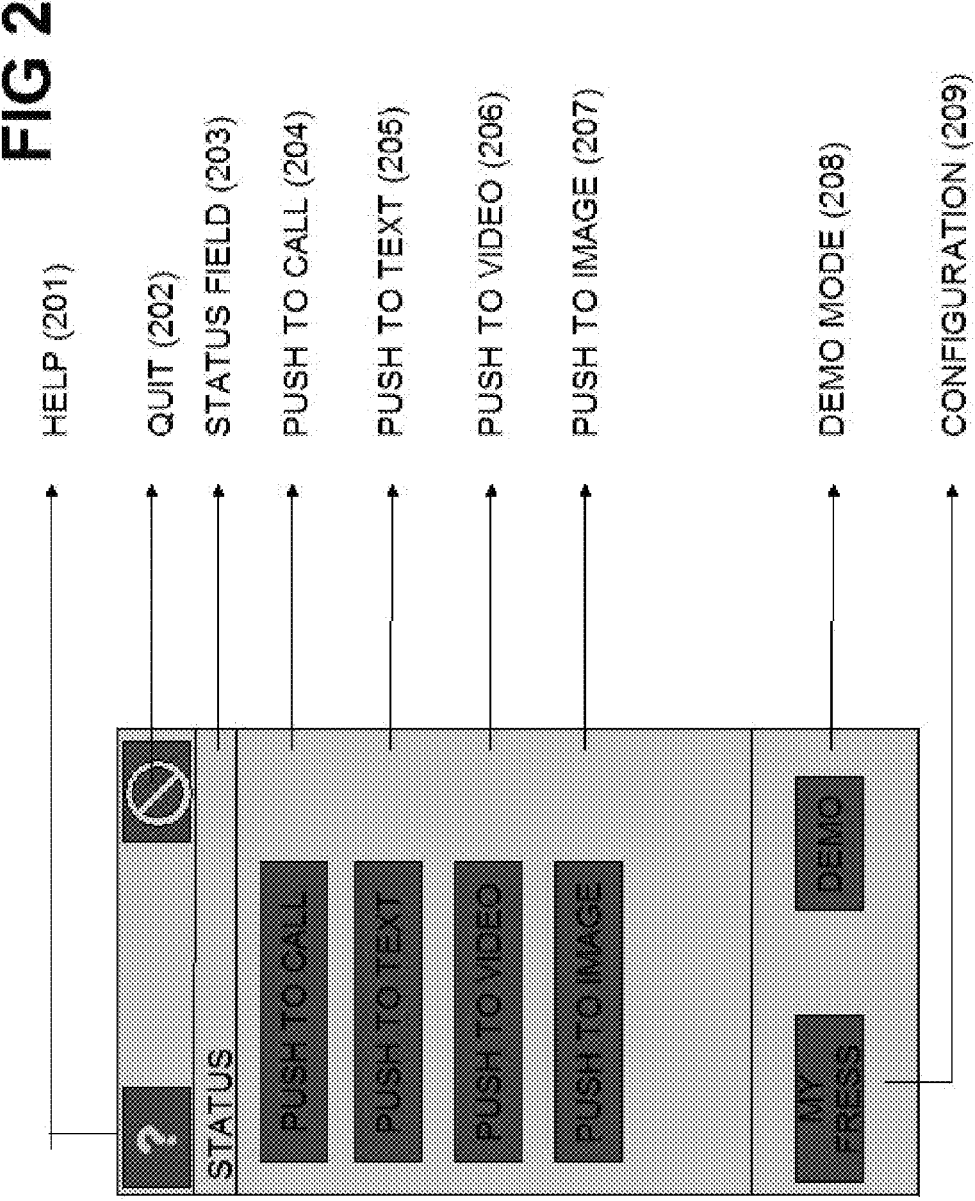
FIG. 2 depicts another exemplary embodiment of the user interface screen in FIG. 1 with some features grayed out according to one aspect of the present invention.

Pressing the PUSH TO TEXT button 105 allows the user to establish an IM/CHAT with the PSAP. This function will only be available if the user has a FRESS connection (described below) and the PSAP is a FRESS PSAP (see below) that allows texting. Otherwise the Button will be shadowed and unavailable (See FIG. 1 vs. FIG. 2).

FRESS Connection

A FRESS connection is when the user has established a successful data connection to the FRESS Server, and has successfully been able to send the FRESS minimum data set to the FRESS Server together with its location data.

There are 3 possible situations for a user that establishes a FRESS connection.

(1) The user pushes the FRESS icon and does not have sufficient cell phone/wireless coverage to be able to send the FRESS minimum data set to the FRESS server. The user can therefore not establish a successful connection with the FRESS server. This will result in that the FRESS USER will only be able to make a VOICE call (911, 112, 999, 066 or all other emergency call) to the closest PSAP.

The FRESS button "PUSH TO TALK" on the users phone, will automatically be configured to speed-dial the correct emergency number for the user's area. In case the user is in an area where multiple choices exist, the FRESS application on the user's phone will show these options (example: police, fire-fighters, ambulance, etc.). If the user is outside his country, the FRESS application will also show the user the possibility to speed dial to the closest embassy of his home country.

The database of numbers to speed dial is built in to the FRESS application installed on the user's phone and therefore independent of a successful FRESS connection to the FRESS server. It will therefore work in any situation, in any area and on any location.

(2) The user pushes the FRESS icon and successfully sends the FRESS minimum data set to the FRESS server together with the location data of the location in where the user is. But the FRESS server responds that there is no PSAP or other call center in the area with FRESS installed and/or activated. The result will be that the FRESS USER will only be able to make a VOICE call to the closest PSAP. The FRESS button "PUSH TO TALK" on the user's phone, will automatically be configured to speed-dial the correct emergency number for the user's area. In case the user is in an area where multiple choices exist, the FRESS application on the user's phone will show these options (example: police, fire-fighters, ambulance, etc.). If the user is outside his country, the FRESS application will also show the user the possibility to speed dial to the closest embassy of the user's home country.

The database of numbers to speed dial is built in to the FRESS application installed on the user's phone, and therefore is independent of a successful FRESS connection to the FRESS server. It will therefore work in any situation, in any area and on any location.

In this scenario, the NON FRESS PSAP can choose to connect to the FRESS webpage, and introduce the IMEI- and/or IMSI- and/or Phone-Number of the user to obtain the FRESS user data set+its location for FREE. Only the PSAP in the area from which the user is calling is able to obtain the information, and only during the time that the user is connected to the FRESS server.

(3) The user pushes the FRESS icon and successfully sends the FRESS minimum data set to the FRESS server together with the location data of the location in where the user is. The FRESS server responds back that there exists a PSAP in the area of the FRESS USER that has FRESS installed and activated. The FRESS server will then open a tunneled data connection through the FRESS server between the FRESS USER and the closest FRESS PSAP. The result will be that the FRESS USER will be able to use voice, text, image and video to communicate to the FRESS PSAP. However, limitations on what the FRESS USER can use on their own initiative may depend on the FRESS PSAP's policy at that location. The FRESS button "PUSH TO TALK" on the user's phone, will automatically be configured to speed-dial the correct emergency number for the user's area. In case the user is in an area where multiple choices exists, the FRESS application on the user's phone will show these options (example: police, fire-fighters, ambulance, etc.). If the user is outside his country, the FRESS application will also show the user the possibility to speed dial to the closest embassy of the user's home country or other designated number determined by the user.

The database of numbers to speed dial is built in to the FRESS application installed on the user's phone, and therefore independent of a successful FRESS connection to the FRESS server. It will therefore work in any situation, in any area and on any location. In the case of establishing a successful tunneled data connection between the FRESS server and the closest FRESS PSAP, or other FRESS call center, the FRESS PSAP or other FRESS call center has the possibility to update the user's emergency number to call in case of a voice communication during that session, and/or to be opened directly from the FRESS PSAP/call center side. As used herein, session means a particular data connection at a given point of time, when disconnected from the FRESS server, the default number to call will be restored.

FRESS PSAP

A FRESS PSAP is a PSAP with the FRESS PSAP application installed and activated. Meaning the application is launched and has established a successful data connection with the FRESS server.

Automated Triggering of Emergency Calls:

Smart phones with FRESS installed will have the capability of automatically triggering alerts when the sensors indicate that conditions have reached a state where help has to be asked for. The type of sensor could be either of the type that is included in the smart phone, such as the accelerometer, or accessories to the smart phone, such as pulsometers and other devices.

In this way FRESS can be used to permanently monitor conditions of FRESS users, and automatically trigger the necessary connections to public, private and personal safety networks.

Pressing the PUSH TO VIDEO button 106 allows the user to send real-time video to the PSAP. This function will only be available if the user has a FRESS connection and the PSAP is a FRESS PSAP that allows real-time video. Otherwise the Button will be shadowed and unavailable (See FIG. 1 vs. FIG. 2).

Pressing the PUSH TO VIDEO button 107 allows the user to send a pre-recorded image or live image to the PSAP. This function will only be available if the user has a FRESS connection and the PSAP is a FRESS PSAP that allows reception of an image. Otherwise the button 107 will be shadowed and unavailable (See FIG. 1 vs. FIG. 2).

Pressing the DEMO button 108 allows the user to practice all functions of the App without really connecting to a real PSAP. This demo automatically connects the user to the FRESS DEMO PSAP, where the user can gain practice on how the App works.

Pressing the MY FRESS button enables the user to input personal data, select a language, enable special conditions and/or configure additional features as PRIVATE PSAP/call center and PERSONAL PSAP/call center. This is the information that is sent to the closest PSAP only, and only when the user hit the FRESS button to ask for HELP. All data is stored on the phone, not on FRESS servers. This is to keep the user's personal information private and secure until an emergency occurs, if any. If none occurs, the user's personal information is never transmitted.

Figure 3:
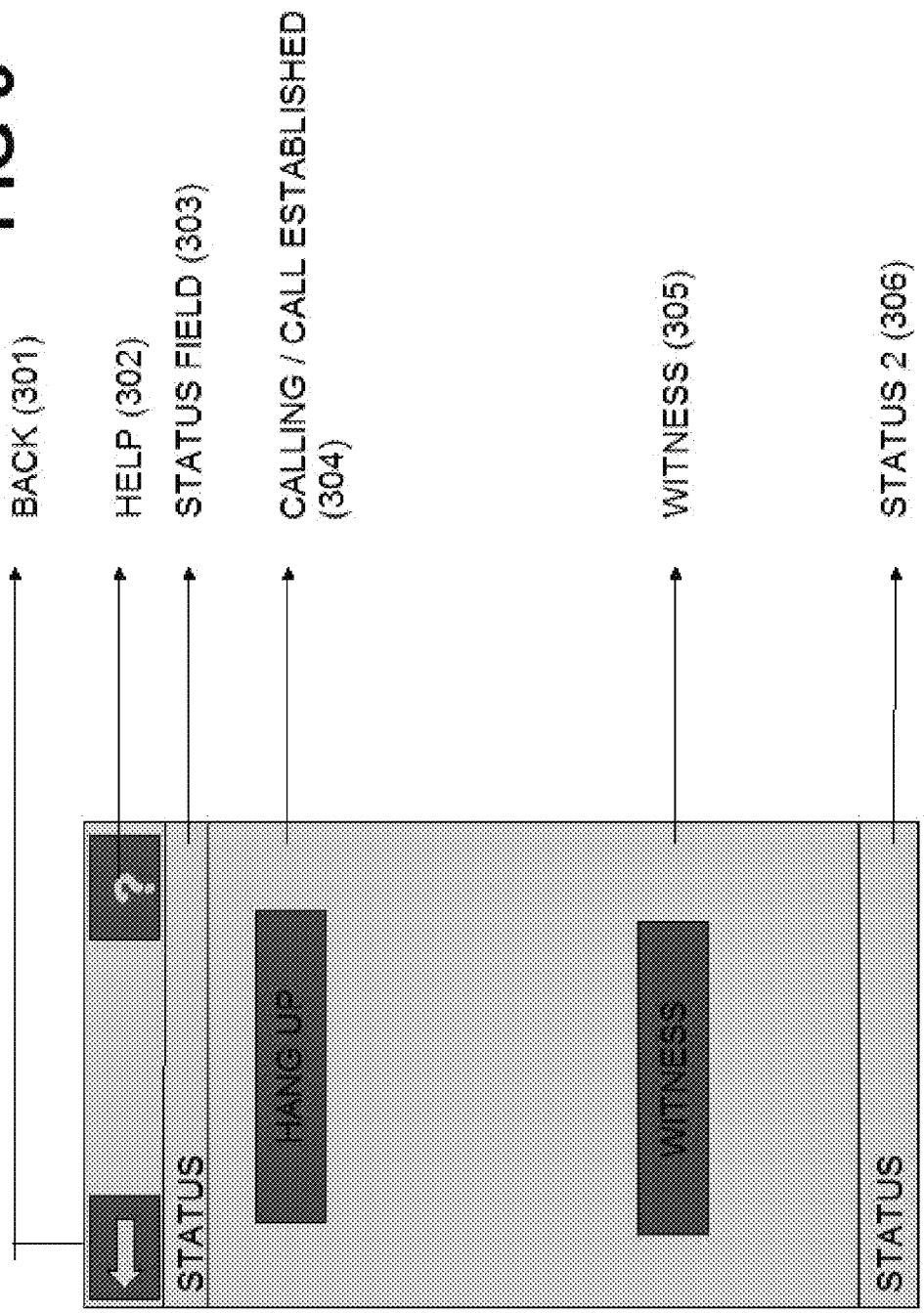
FIG. 3 depicts yet another exemplary embodiment of a user interface screen on a mobile telephone, smart phone, or other similar communication device according to one aspect of the present invention.

Turning to FIG. 3, shown therein is another user display screen according to one exemplary embodiment of the present invention. Pushing the BACK button 301 takes the user back to the App main menu.

Pushing the HELP button 302 takes the user into the HELP menu for the App "PUSH TO CALL" in the user's native language specified in MY FRESS or by the phones default language.

The STATUS FIELD 303 shows the call connection status, e.g.: "Calling 112 . . . ", "Call established", "Call lost, reconnecting . . . 5 sec . . . ", or if the user is in the DEMO mode, etc.

In case "connection" is lost by the carrier, the App will automatically try to re-connect. First, second and third time immediately, then 5 times with 5 second interval, and after that 5 times with 10 second interval and after that every 30 seconds.

Depending on the user's configuration or location, this SCREEN 304 will change.

In case the user is in his HOME COUNTRY, and the user's home country has a single emergency number, and the user has not configured a private or personal PSAP. Then the screen will look as in FIG. 3, directly after pushing PUSH TO CALL in the App's main menu.

The App will try to establish a normal voice-to-voice communication with the user's closest PSAP, and the user may HANG UP the call by pushing the button 304.

Figure 4:
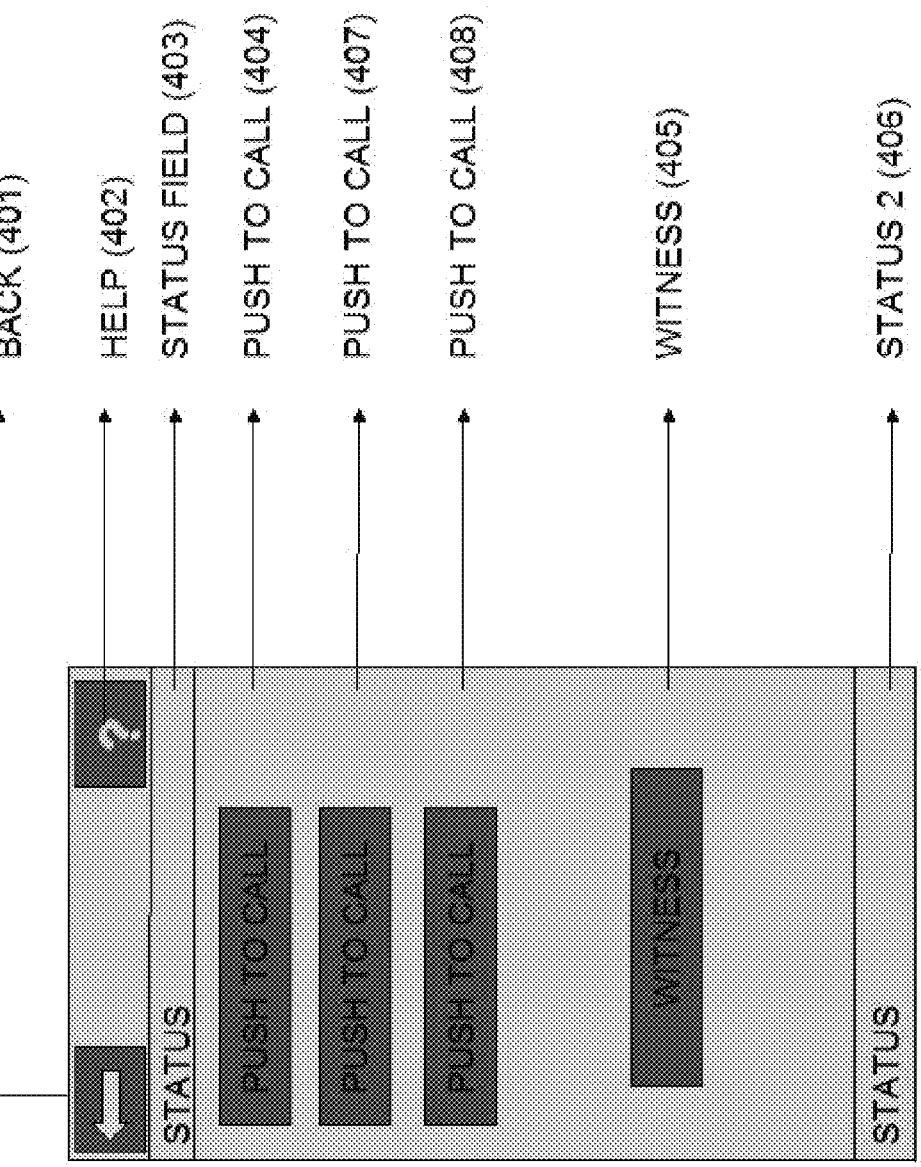
FIG. 4 depicts still another exemplary embodiment of a user interface screen on a mobile telephone, smart phone, or other similar communication device according to one aspect of the present invention.

Turning to FIG. 4, shown therein is another user display screen according to one exemplary embodiment of the present invention. In case the user is in a location where there is no single emergency number and/or the user has configured a PRIVATE/PERSONAL PSAP or call center and/or the phone detects the user is not in his home country, the App will give you options where to call, as in FIG. 4. Once the user selects an option, the App will display a screen as shown in FIG. 3. This will occur when the user is located in an area with no single emergency number, in which case one option will be Police, Fire or EMS. In case of PRIVATE/PERSONAL PSAP/call center, the options will be the PUBLIC PSAP plus the options configuration selected in PRIVATE/PERSONAL PSAP/call center. In case the App detects the user is out of his home country, the country's embassy telephone number will be given. All of these conditions can be by separate or combined.

The witness button 405 allows the user to specify that he/she is not the one that needs the emergency, in other words, they are asking for help for someone else. This function will only be available if the user has a FRESS connection and the PSAP is a FRESS PSAP that allows for the witness function. Otherwise the Button 405 will be shadowed and unavailable.

The status field 406 tells the user if they are a witness or not, and other less important information.

Figure 5:
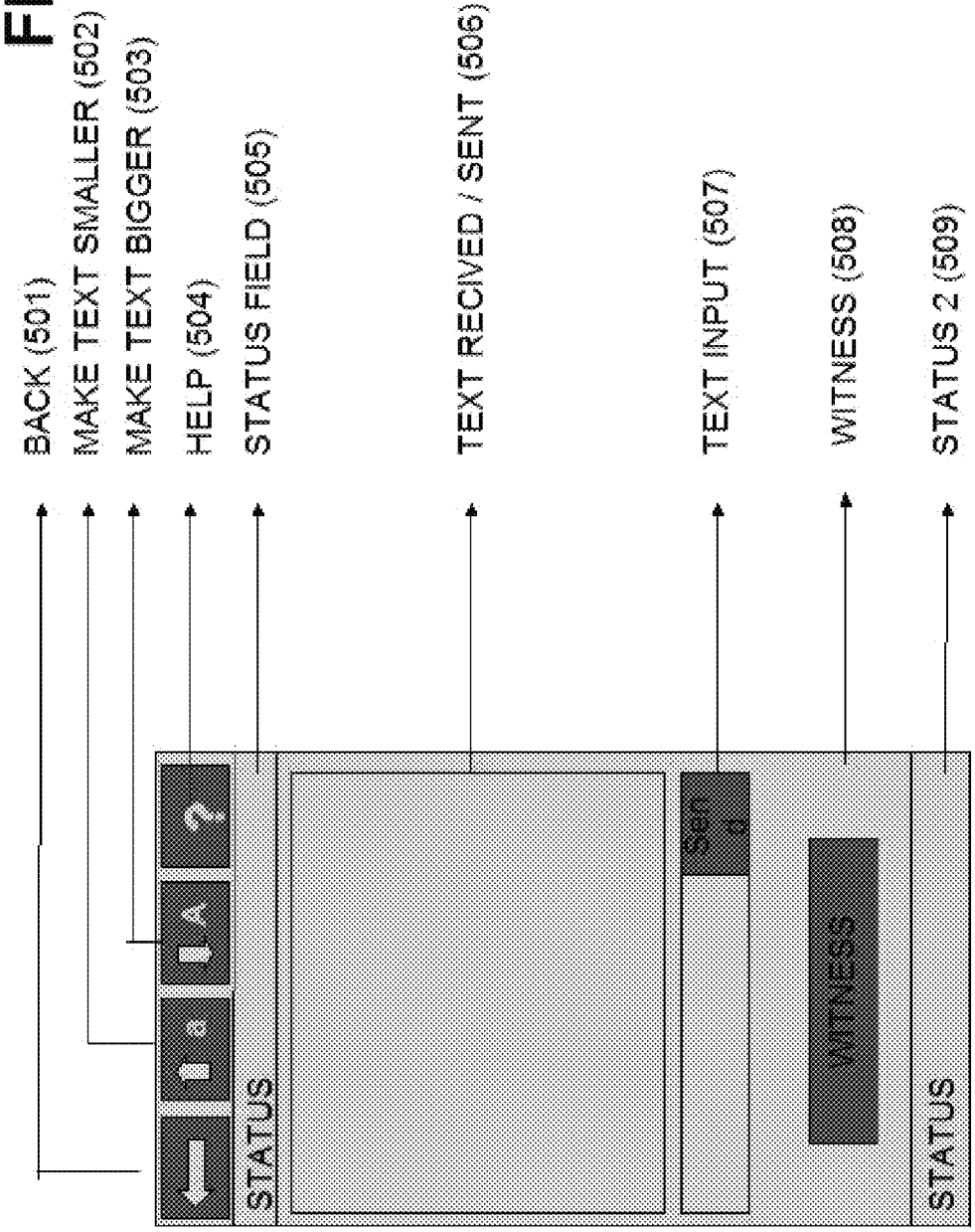
FIG. 5 depicts yet another exemplary embodiment of a user interface screen on a mobile telephone, smart phone, or other similar communication device according to one aspect of the present invention.

Turning to FIG. 5, shown therein is another user display screen according to one exemplary embodiment of the present invention. Pushing the BACK button 501 takes the user get back to the App main menu.

Upon pushing button 502, the text that appears in the CHAT BOX will become smaller, whereas pushing button 503, the text that appears in the CHAT BOX will become bigger.

Pressing the HELP button 504 takes the user into the HELP menu for the App's "PUSH TO VIDEO" in the user's native language specified in MY FRESS or by the phones default language.

STATUS FIELD 505 shows the status of the CHAT connection status: "CHAT ESTABLISHED.", "CHAT STOPPED", "Connection lost, reconnecting . . . 5 sec . . . ", or if the user is in the demo mode, etc.

In case "connection" is lost by the carrier, the App will automatically try to re-connect. First, second and third time immediately, then 5 times with 5 second interval, and after that 5 times with 10 second interval and after that every 30 seconds. All TEXT during the time of lost connection will be cached on the phone and transmitted in the background once connection is re-established.

In part 506 of the screen is display the TEXT messages sent and received to/from the PSAP. The text will be shown in the SIZE specified by button 502 or 503. The Size will be stored for future connections. All text received will be translated into the user's native language in case the PSAP has FRESS with translation service into the user's native language. Next to each message sent by the user to the PSAP, a confirmation of delivery will be shown at the end of the sentence.

In part 507 of the screen, the user can introduce any text message desired to be sent to the PSAP in his native language. The message will be automatically translated into the language of the PSAP. Once the user clicks on this part 507 of the screen, a virtual keyboard will open. In case the phone has a physical keyboard, it could be used as well. To send the message, the user hits the SEND button and/or INTRO on his keyboard.

Button 508 allows the user to specify that he/she is not the one that needs the emergency, in other words, they are asking for help for someone else. This function will only be available if the user has a FRESS connection and the PSAP is a FRESS PSAP that allows for WITNESS function. Otherwise button 508 will be shadowed and unavailable.

Status field 509 informs the user if the App is in WITNESS MODE or not, if the PSAP is writing a message back, etc.

Figure 6:
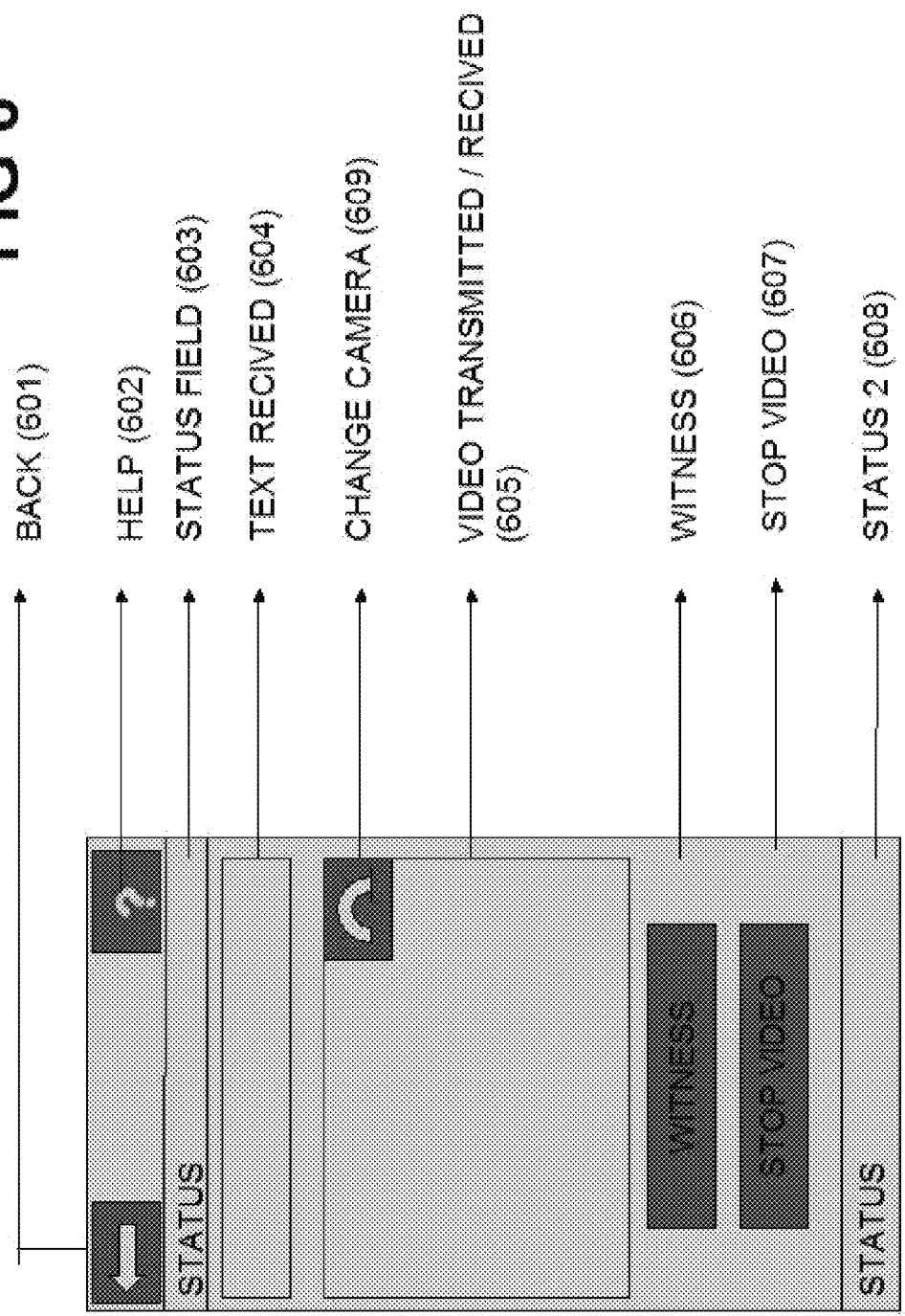
FIG. 6 depicts still another exemplary embodiment of a user interface screen on a mobile telephone, smart phone, or other similar communication device according to one aspect of the present invention.

Turning to FIG. 6, shown therein is another user display screen according to one exemplary embodiment of the present invention. By pushing the back button 601, the user is taken back to the App main menu.

By pushing the HELP button 602, the user is taken to the HELP menu for the App "PUSH TO VIDEO" in his native language specified in MY FRESS or by the phones default language.

Status field 603 shows the VIDEO connection status: "VIDEO TRANSMITTING.", "VIDEO STOPPED", "Connection lost, reconnecting . . . 5 sec . . . ", or if the user is in demo mode, etc.

In case "connection" is lost by the carrier, the App will automatically try to re-connect. First, second and third time immediately, then 5 times with 5 second interval, and after that 5 times with 10 second interval and after that every 30 seconds. All video recorded during the time of lost connection will be cached on the phone and transmitted in the background once connection is re-established.

In part 604 of the screen, the user will receive instructions and or messages from the PSAP. In case the user wants to respond to those messages, the user can just click on the field and the chat window will be open—without losing video connection. The text will be shown in large alphanumerical characters in order to allow the user to point the camera at objects under the camera while reading the text. The messages will scroll slowly to the right or left (language dependent) in case the message does not fit in the text box.

In part 605 of the screen, the user can see the video that is being sent in real time to the PSAP. In case the user has a cell phone with two cameras (front/back), the user will see a icon 609 in the upper right corner of the video, that by pushing it switches between the cameras.

The same window 605 can also be used to receive video instructions and/or images from the PSAP.

Button 606 allows the user to specify that he/she is not the one that needs the emergency, in other words, they are asking for help for someone else. This function will only be available if the user has a FRESS connection and the PSAP is a FRESS PSAP that allows for WITNESS function. Otherwise the Button will be shadowed and unavailable.

Button 607 allows the user to STOP any transmitting or receiving of a video or image at any time to/from the PSAP.

Status field 608 tells the user if they are a witness or not, and other less important information.

Figure 7:
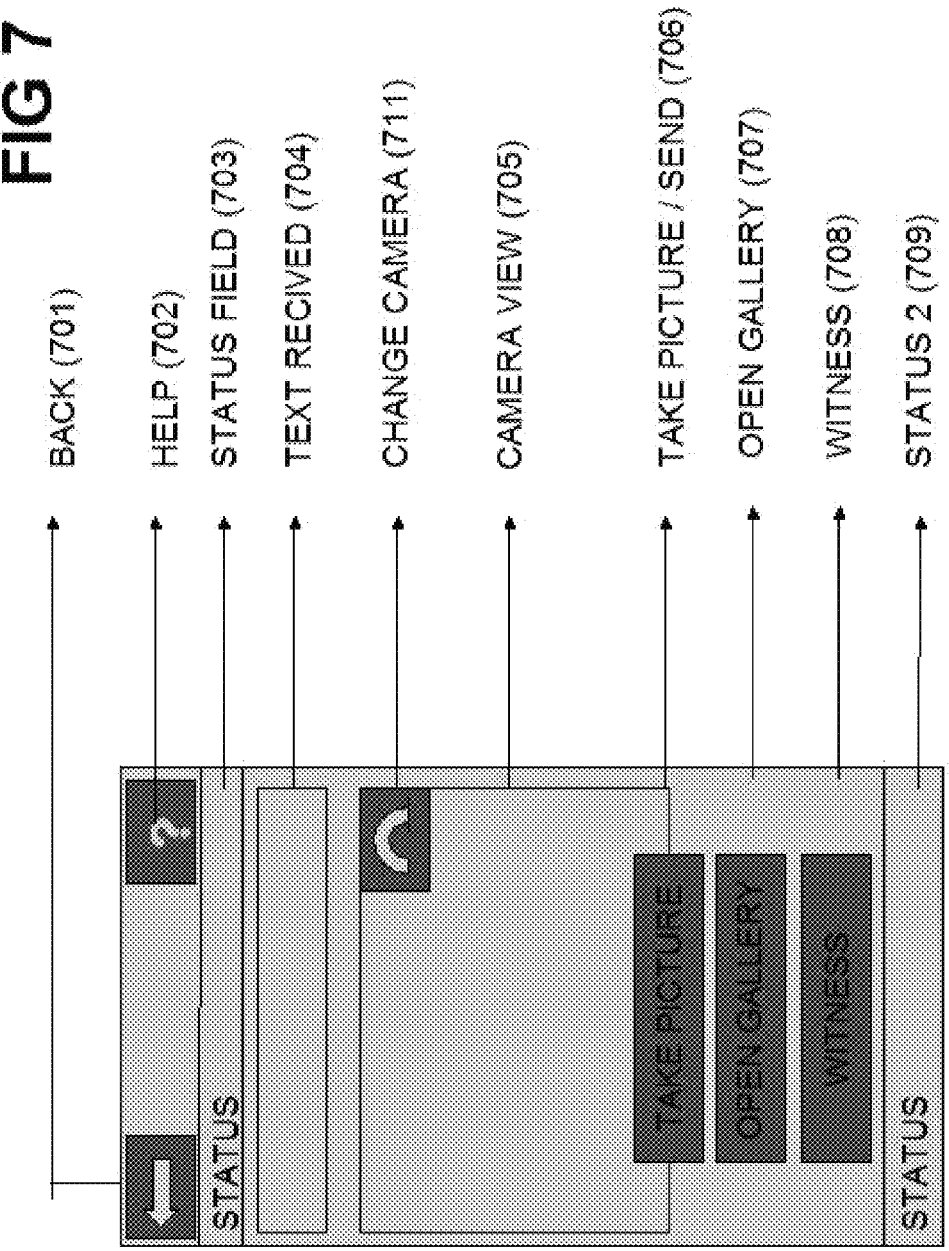
FIG. 7 depicts yet another exemplary embodiment of a user interface screen on a mobile telephone, smart phone, or other similar communication device according to one aspect of the present invention.

Turning to FIG. 7, shown therein is another user display screen according to one exemplary embodiment of the present invention. Pressing back button 701 takes the user back to the App main menu.

Pressing the help button 702 takes the user into the help menu for the App "PUSH TO VIDEO" in his native language specified in MY FRESS or by the phones default language.

Status field 703 shows the image connection status: "TAKE A IMAGE TO SEND", "IMAGE BEING TRANSMITTED.", "IMAGE SENT", "Connection lost, reconnecting . . . 5 sec . . . ", or if the user is in demo mode, etc.

In case "connection" is lost by the carrier, the App will automatically try to re-connect. First, second and third time immediately, then 5 times with 5 second interval, and after that 5 times with 10 second interval and after that every 30 seconds. All images taken and selected during the time of lost connection will be cached on the phone and transmitted in the background once connection is re-established.

In part 704 of the screen, the user will receive instructions and or messages from the PSAP. In case the user wishes to respond to those messages, the user just click on the field and the chat window will be open—without losing video connection. The text will be shown in large alphanumerical characters in order to allow the user to point the camera at objects under the camera while reading the text. The messages will scroll slowly to the right or left (language dependent) in case the message does not fit in the text box.

In part 705 of the screen, the user can see the view of the camera, the picture taken or the picture selected from his personal gallery.

In case the user has a cell phone with two cameras (front/back), the user will see a icon 711 in the upper right corner of the camera view, that by pushing it switches between the cameras.

In case the user wants to take a real time snapshot of the emergency scene, the user hits the button 706. The image will be shown, and the text of the button will change to "SEND". If SEND is pushed (on button 706), the snapshot taken will be sent to the PSAP.

In case the user has selected a image from "OPEN GALLERY", the button 706 will change to SEND. If SEND 706 is pushed, the selected image will be sent to the PSAP.

Open gallery 707 allows the user to select any image to be sent from the phone's image gallery on the phone.

Witness button 708 allows the user to specify that he/she is not the one that is need of emergency services, in other words, they are asking for help for someone else. This function will only be available if the user has a FRESS connection and the PSAP is a FRESS PSAP that allows for witness function. Otherwise the witness button 708 will be shadowed and unavailable.

Status field 709 tells the user if they are a witness or not, and other less important information.

User's Social Network:

One aspect of the present invention is that it defines a new concept around the term PSAP, which usually refers to Public Safety Answering Point. Typically, this means the call center where emergency calls are answered and where the dispatch of the emergency services is coordinated.

The FRESS solution redefines the acronym PSAP, giving it three different meanings:
1) Public Safety Answering Point;
2) Private Safety Answering Point/call center; and
3) Personal Safety Answering Point/call center.

Figure 8:
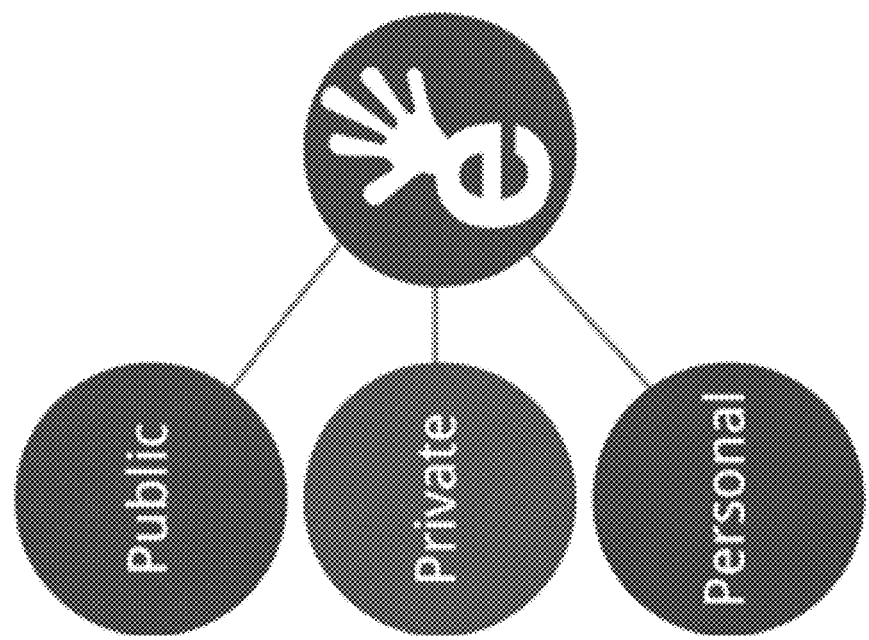
FIG. 8 depicts a diagram showing the three possible meanings of PSAP due to the present invention.

The three meanings PSAP of are outlined in FIG. 8.

The redefinition of PSAP is the backbone on which the structure of the FRESS Emergency Social Network was created. When a FRESS user configures the FRESS data set, one of the fields that is completed includes the people that the user wants alerted if the FRESS button was pressed. This configuration allows users to define the following:

Public: The way FRESS works with the public safety has been described above.

Private: Users may define other parties to be alerted in case the FRESS button is pressed.

Other parties may include, but is not limited to:
(i) User's physician/nurse practitioner—In case of heart condition, diabetes, epilepsy, allergies, etc.; (ii) User's insurance company—In case of auto accident, theft, etc.; (iii) Private security company—In case of a campus situation; (iv) private security company—in case of travel to dangerous destinations; or (v) a home security company—in case of burglary.

Personal: FRESS users may want to define next of kin to receive alerts when they press the FRESS button.

This may be especially useful and needed in the cases, of, but not limited to:

Parents who want to know when their children are in danger.

People who want to know when their elderly parents are in danger.

Configuration of the FRESS button will always alert the Public Safety Answering Point, except in the case where the user expressly chooses that this is not to happen, within the first 5 seconds of launching the FRESS APP. There will be an "opt out" mechanism, by which the Public Safety Answering Point is excluded from the call, after which a menu will appear from which the FRESS user can select the people registered in My FRESS to send the alert to. Basically, this will be a list with radio buttons, in which putting a check mark by the list item will mean those people will receive the alert.

The "opt out" button is a key feature of the FRESS Emergency Social Network. The user can use FRESS even when the event that is taking place does not warrant a 9-1-1 emergency call.

PSAP Social Network:

FRESS allows PSAPs that are equipped with the FRESS interface to create their own Emergency Social Network. Currently, there is very little relevant contact between PSAPs, even neighboring PSAPs. The lack of communication between PSAP occurs in the United States and Europe. This lack of communication and coordination can lead to unwanted outcomes which result in death, etc.

FRESS allows easy communication and coordination between PSAPs. It also allows events to be passed from one PSAP to another using a simple drag and drop technique. With the rise of IP telephony and where the geographical location of the mobile phone may not be known, this feature could be very useful to a PSAP as the event can be "dragged" and "dropped" onto the PSAP that has jurisdiction in the area where the mobile phone is located.

When such an event is passed from one PSAP to another, all the event history follows the event. All communications, whether instant messages, video or photos are available to the receiving PSAP, which can then manage the event as it would any other.

Large Scale Events:

In the case of large scale crises, PSAPs from around the globe can work together on the same series of events, by simply taking on the identity of the PSAP at the location of the large scale event. This can be incredibly advantageous in this kind of large scale event, in which normally there is a collapse of the local PSAP, unable to attend the incoming calls, be it due to line saturation or operator overload.

The larger the event, the larger the number of PSAPs around the world that can connect to attend FRESS calls, and the greater the number of people asking for help who can be attended to successfully.

Even in the case of moderate events, where one PSAP is overloaded due to density of calls, the calls could be attended by the night-shift of a PSAP on the other side of the globe.

It should be taken into account that dispatch of police, fire, ambulance and other services to deal with these large scale emergencies will always reside in the hands of the local PSAP. Only until such time as they are authorized by the primary PSAP through the FRESS PRO program will the dispatching capabilities become available to additional PSAPs.

The present invention allows for a PSAP or any call center or command and control center to send emergency broadcast alerts to FRESS enabled devices or non-enabled FRESS devices. The emergency broadcast alerts can be done over Bluetooth and/or WiFi through FRESS enabled devices as well all other devices (or selected phones) that have WiFi or Bluetooth enabled. The emergency broadcast alert can be sent to selected phones based on location or category of user (e.g., sent only to police with registered phone numbers).

Figure 9:
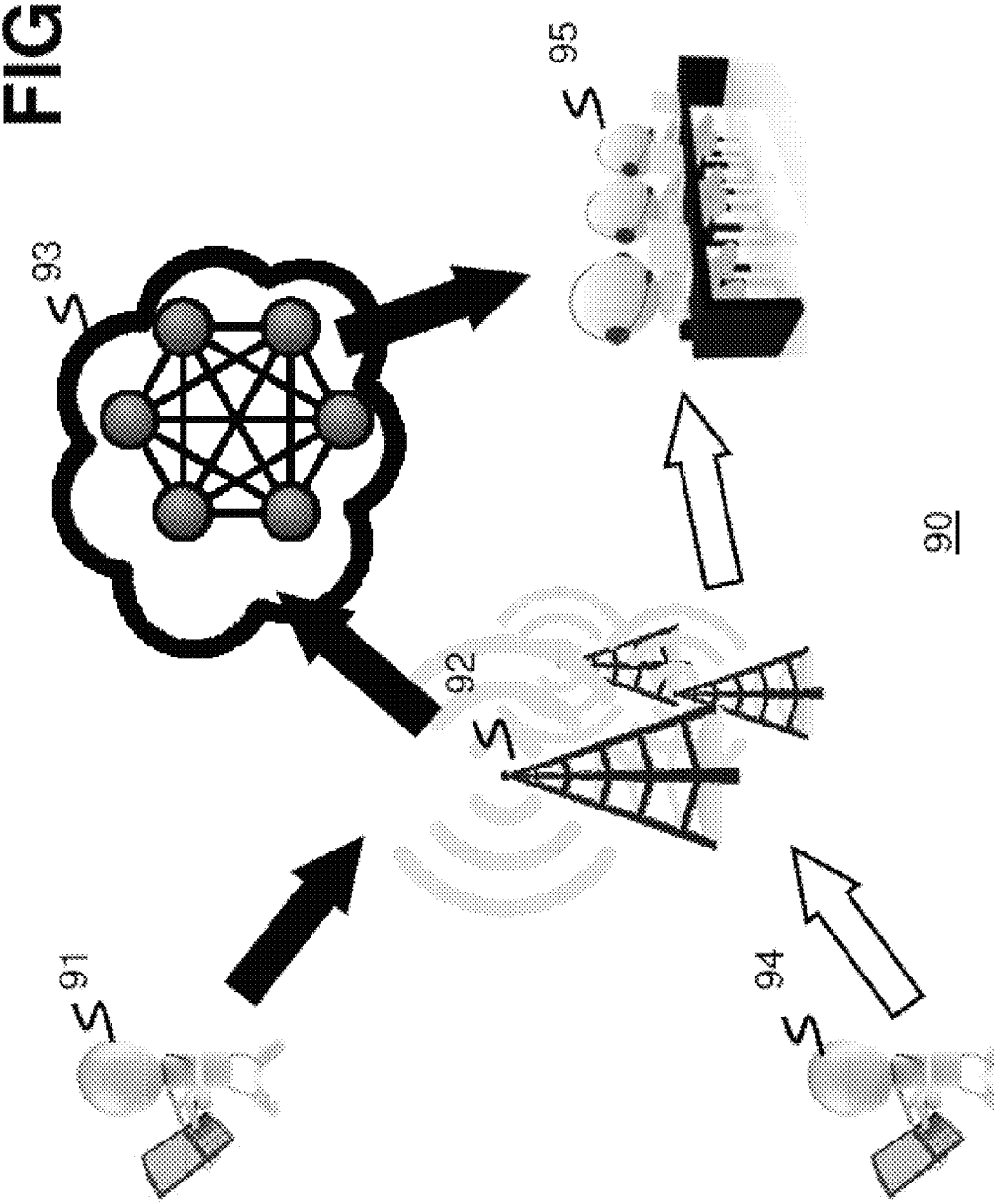
FIG. 9 a block diagram of an exemplary embodiment of a system operating in accordance with another aspect of the present invention.

Turning to FIG. 9, shown therein is a block diagram of a system 90 operating in accordance with one aspect of the present invention. User 91 is a FRESS user. When user 91 presses the FRESS button on his/her phone, the data call (black flows) goes over the local carrier's network 92 to connect to the FRESS cloud 93 over the Internet. The FRESS cloud locates and routes the user to the corresponding PSAP 95. Voice, text, video and images will be enabled.

The white arrows show the flow involving a non-FRESS user 94 who makes a regular emergency call. In this case, the voice call is routed by the local carrier 92 to the corresponding PSAP 95. The white arrows also indicate how FRESS user 91 with no connectivity to the FRESS cloud 93 would be routed to the corresponding PSAP 95.

Figure 10:
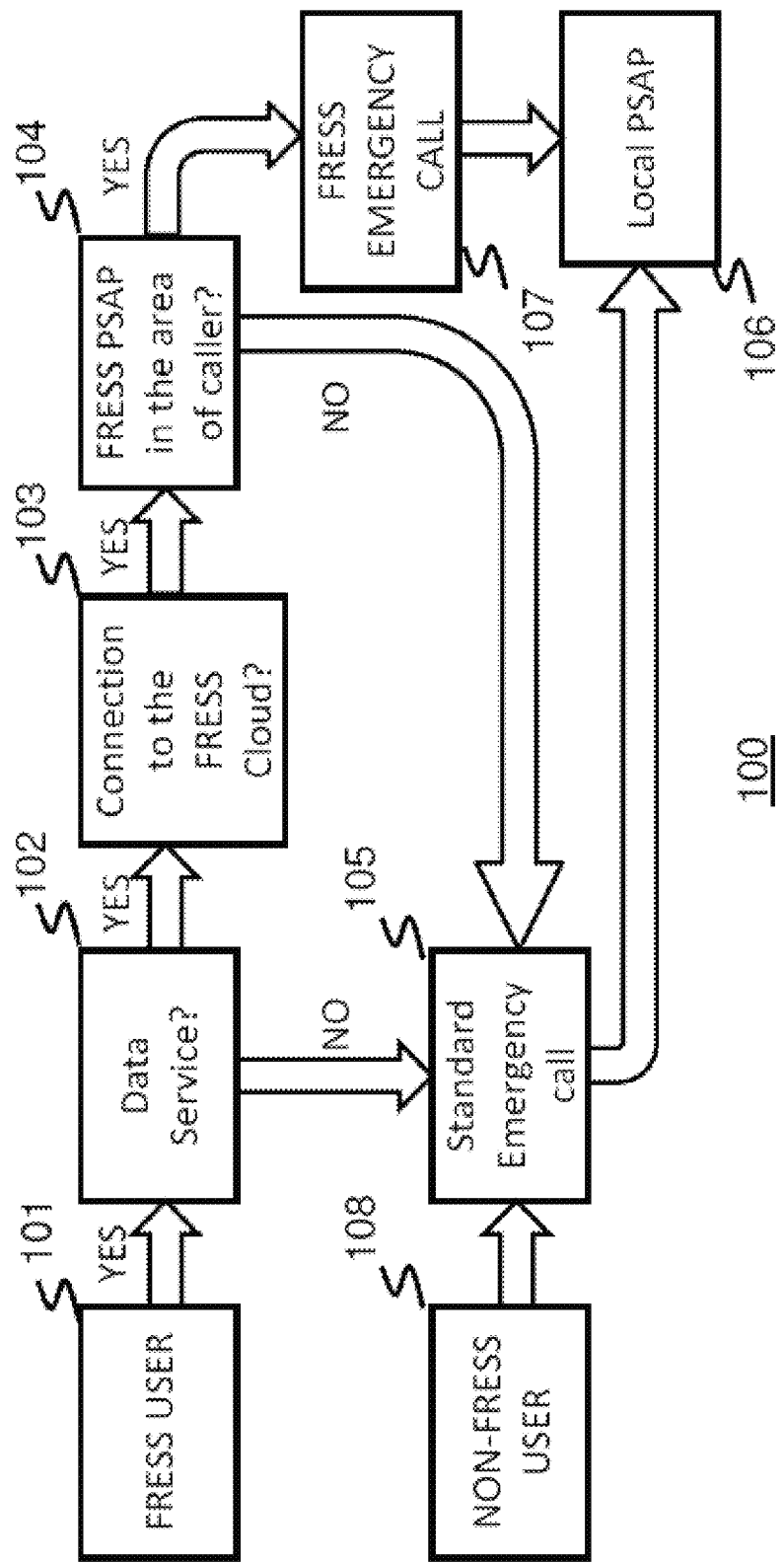
FIG. 10 depicts a block diagram of an exemplary embodiment of a method operating in accordance with another aspect of the present invention.

FIG. 10 shows a block diagram of the various steps to implement the method described in the paragraph above in the environment of FIG. 9.

Figure 11:
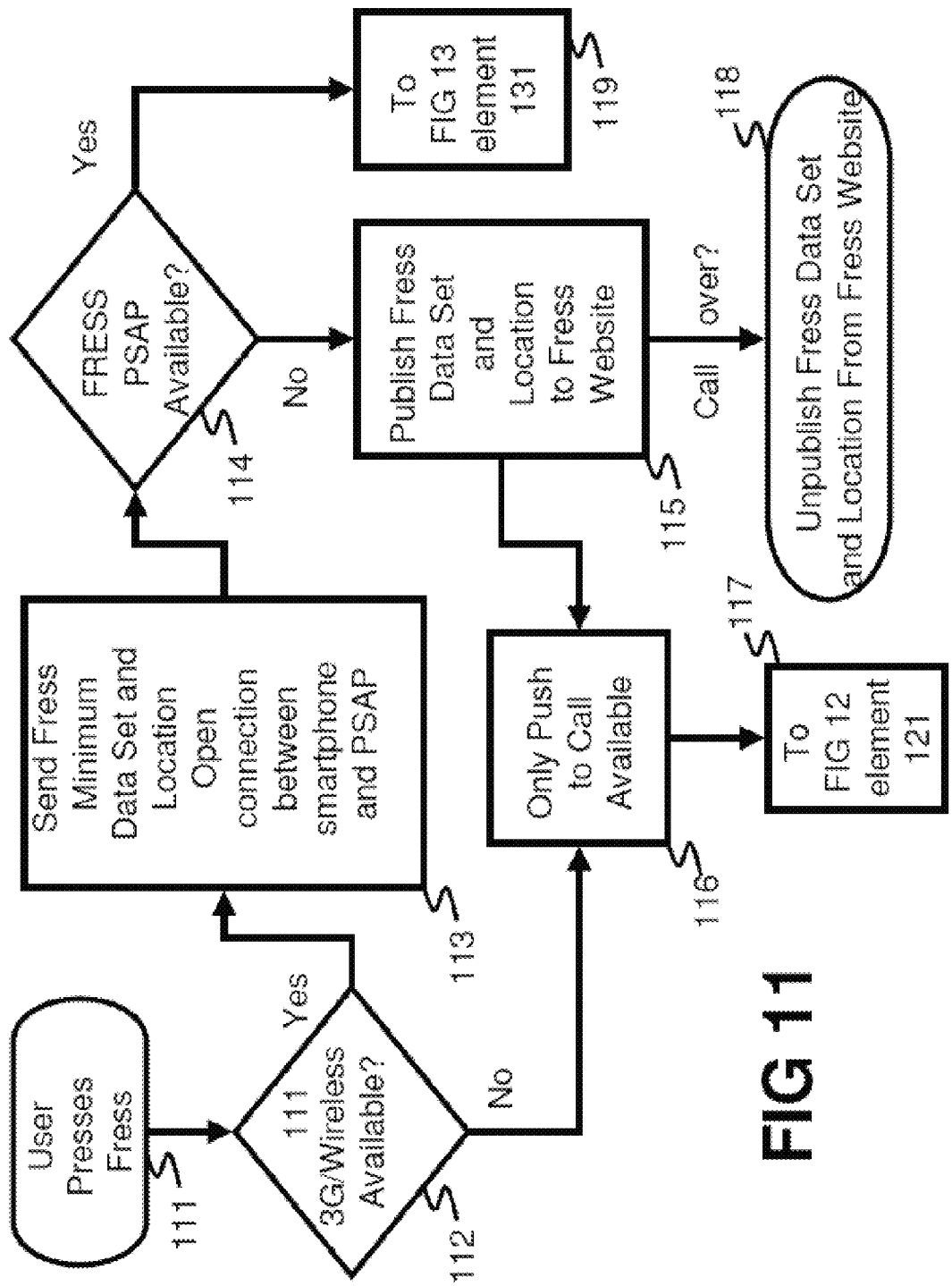

FIGS. 11-13 show a more detailed description of the various steps in an exemplary method according to another aspect of the present invention. In element 111, a user activates FRESS on his/her cellphone (i.e., a calling device) by "pressing" on the FRESS icon on their cellphone, laptop, tablet or pocket computer. FRESS could also be triggered by a third-party/external/independent application or sensor.

In element 112, the device on which FRESS has been activated on, checks for any data connectivity (e.g., Wi-Fi, 3G, 4G, GPRS, EDGE, Bluetooth, etc.). In case of data connectivity (Yes), the device tries to establish a connection with the FRESS Cloud. The FRESS cloud is a network of multiple servers connected in mesh and to the Internet. In case a successful connection is established the process continues to element 113. If Not, the process continues to element 116.

In element 113, the FRESS application on the user's device sends the FRESS MINIMUM DATA SET (FMDS) to the FRESS cloud. Within the FMDS is the location of the calling device. In element 114, the FRESs cloud checks if the calling device is within an area where a PSAP with FRESS activated exists. If YES, the process continues to element 119 and moves to element 131 in FIG. 13. If Not, the process continues to element 115. Also in element 113, the FRESS cloud establishes a connection between the calling device and the correct PSAP. At the same time, the FMDS is sent to the PSAP. As the connection is done, the calling device gives the option to the user to make a VOICE CALL (see elements 132-133, FIG. 13) to the PSAP; SEND LIVE VIDEO (see elements 134-135, FIG. 13) to the PSAP; SEND A PICTURE (see elements 136-137, FIG. 13) to the PSAP; or OPEN CHAT and TEXT (see elements 138-139, FIG. 13) to the PSAP. If nothing is selected, the process stops. Either the USER from the calling device, or the OPERATOR at the PSAP can activate one or more OPTIONS at any time.

In element 132, if the USER from the calling device selects the option "PUSH TO CALL", by pressing that button, the calling device check if the "call" is domestic or not (moves to element 133, which in turn moves to element 126 of FIG. 12).

Turning to FIG. 12, if domestic (element 123)—the correct emergency number to call will be dialed from the calling device.

If NOT domestic (element 125)—the correct emergency number to call will be displayed for the user on the calling device, as the user's home country's embassy or consul at the closest location near the calling device.

If the USER from the calling device selects the option "PUSH TO TEXT" (element 138), by pressing that button, the calling device will establish a TEXT CHAT with the PSAP (element 139).

If the USER from the calling device selects the option "PUSH TO IMAGE" or presses send picture (element 136), by pressing that button, the calling device will allow the user on the calling device to either take a LIVE picture to be sent to the PSAP or to select a picture from the calling device image gallery (element 137).

If the USER from the calling device selects the option "PUSH TO VIDEO" (element 134), by pressing that button, the calling device will establish a LIVE VIDEO STREAM from the calling device's camera to the PSAP (element 135).

The calling devices FMDS is sent and published in a restricted area on the FRESS webpage (element 115), and can be accessed and viewed by entering in calling device phone number or IMEI number on the FRESS webpage.

The information published in the restricted area on the FRESS website will only be accessible during the time the calling device has established connection to the FRESS CLOUD and up to thirty minutes after disconnecting from the FRESS cloud (see element 118).

The user on the calling device can only make use of the "PUSH TO CALL" function, which allows the calling device to establish a VOICE only communication with the closest PSAP.

If the USER from the calling device selects the option "PUSH TO CALL" (element 132), by pressing that button, the calling device check if the "call" is domestic or not (element 122).

If NOT domestic—the correct emergency number to call will be displayed for the user on the calling device (element 125), as the user's home country's embassy or consul at the closest location near the calling device. If domestic—the correct emergency number to call will be shown (element 123) and dialed from the calling device. The USER on the calling device must agree to establish a call to the proposed number.

Options

On the APP side, the FRESS button can have 2 functions—Emergency (any kind) and anonymous reporting, where the button function is the same except that personal information in the data set is filtered out before the data set reaches the PSAP.

It should be noted that the application can be implemented on any smart phone, tablet or other similar device. Moreover, the present invention could be employed on any mobile device, however, in certain cases the service may be limited for older phones, such as 2G phones.

The present invention also provides:
- a FRESS emergency call number service for 9-1-1, 112, 066, 999, or for any emergency call number worldwide;
- FRESS PRO—the FRESS emergency service used by first responders (police, fire, EMS); and
- FRESS Enterprise—very similar to FRESS emergency call number service but customized for clients that will connect into a non-public call center.

In sum, FRESS technology creates an emergency social network by connecting the mobile device with the call center. The present invention provides the ability to connect the mobile device to a call center, via the FRESS cloud, and other mobile devices, thereby creating quickly and easily an emergency social network.

What is claimed is:

1. A non-transitory computer readable media having stored thereon a mobile application to be executed on a handheld computing device to cause a processor to:
   store data regarding connections to one or more of public safety answering points with which to share information in an emergency situation;
   establish one or more connections with an appropriate one of the one or more public safety answering points upon activation of an emergency button, wherein said one or more connections include one or more of the following connections: voice, text, image and video;
   enable a user to store private information to share in an emergency situation;
   enable a user to create and store a list of contacts for a customized private social emergency response network with which to send the stored private information in an emergency situation;
   establish, during an emergency situation, a platform via which the user and those listed in the list of contacts for the customized private social emergency response network can share information; and
   send to those on the list of contacts the stored private information during an emergency situation, wherein the mobile application further causes the processor to establish a telephone connection with the public safety access point by determining whether the handheld computing device is located in a domestic location or a foreign location, and:
   (i) if the handheld computing device is located in a domestic location, the mobile application causes the processor to display an emergency telephone number and establish a telephone call using the displayed emergency telephone number; or
   (ii) if the handheld computing device is located in a foreign location, the mobile application causes the processor to display a local emergency telephone number and a telephone number of an embassy for a user of the handheld computing device and establish a telephone call using the displayed local emergency telephone number and/or the displayed embassy telephone number.

2. The non-transitory computer readable media according to claim 1, wherein said mobile application further causes the processor to:
   enable a user to store personal information to share in an emergency situation;
   enable a user create a second list of contacts for a customized personal social emergency response network with which to share personal information in an emergency situation; and
   send the stored personal information to those on the second list of contacts during an emergency situation.

3. The non-transitory computer readable media according to claim 2, wherein said mobile application further causes the processor to establish, during an emergency situation, a second platform via which the user and those listed in the second list of contacts for the customized private social emergency response network can share information.

4. The non-transitory computer readable media according to claim 1, wherein said private social emergency response network includes one or more of the following: one or more doctors, one or more health care providers, a group of specifiable entities, and a group of specifiable individuals.

5. The non-transitory computer readable media according to claim 2, wherein said personal emergency response network includes one or more of the following: one or more family members, one or more individuals, one or more employers, one or more entities, and one or more groups of individuals.

6. The non-transitory computer readable media according to claim 1, wherein upon pressing a preselected button on the handheld device, the mobile application further causes the processor to transmit a predetermined data set to a server configured to interact with the mobile application.

7. The non-transitory computer readable media according to claim 6, wherein said mobile application further causes the processor to receive a returned data set from the server, said returned data set including one or more acceptable forms of connections available on server.

8. The non-transitory computer readable media according to claim 7, wherein said mobile application displays said one or more acceptable forms of connection to the user upon receipt by the mobile application.

9. The non-transitory computer readable media according to claim 8, wherein said mobile application establishes a user connection with the server using a selected one of the one or more acceptable forms of connection selected by the user.

10. The non-transitory computer readable media according to claim 9, wherein if the user selects a telephone connection, the mobile application establishes a telephone connection with the appropriate public safety answering point.

11. The non-transitory computer readable media according to claim 9, wherein if the user selects a video connection, the mobile application establishes a video connection with the appropriate public safety answering point.

12. The non-transitory computer readable media according to claim 9, wherein if the user selects a picture connection, the mobile application establishes a picture connection with the appropriate public safety answering point.

13. The non-transitory computer readable media according to claim 9, wherein if the user selects a text connection, the mobile application establishes a text connection with the appropriate public safety answering point.

14. A computer implemented emergency contact method comprising:
   a) determining by a portable computing device whether a wireless network with advanced capability is available;
   b) sending by the portable computing device a minimum data set and a location of the portable computing device to a public safety answering point, if an advanced wireless network is available;
   c) opening a connection between the portable computing device and the public safety answering point, if the advanced wireless network is available;
   d) establishing a telephone connection with the public safety answering point, if the advanced wireless network is not available;
   e) determining whether a server configured to interact with the portable computing device is available;
   f) publishing the minimum data set and location on a predetermined website and establishing a telephone connection with the public safety answering point, if a server configured to interact with the portable computing device is not available;
   g) displaying a push to call button, a push to video button, a send picture button and a push to text button, if a server configured to interact with the portable computing device is available, and:

h) if the user presses the push to call button, establishing a telephone connection with the public safety answering point;
i) if the user presses the push to video button, sending a video captured by the portable computing device to the server;
j) if the user presses the send picture button, sending a picture captured by the portable computing device to the server; and
k) if the user presses the push to text button, establishing a text connection between with the portable computing device and the server, wherein establishing a telephone connection with the public safety access point includes determining whether the portable computing device is located in a domestic location or a foreign location, and:
   (i) if the portable computing device is located in a domestic location, displaying an emergency telephone number and establishing a telephone call using the displayed emergency telephone number; or
   (ii) if the portable computing device is located in a foreign location, displaying a local emergency telephone number and a telephone number of an embassy for a user of the portable computing device and establishing a telephone call using the displayed local emergency telephone number and/or the displayed embassy telephone number.

15. The emergency contact method according to claim 14, wherein the portable computing device sends a most recent video captured by the portable computing device when the user presses the push to video button.

16. The emergency contact method according to claim 14, wherein the portable computing device activates a video camera and sends streaming video when the user presses the push to video button.

17. The emergency contact method according to claim 14, wherein the portable computing device sends a most recent picture captured by the portable computing device when the user presses the send picture button.

18. The emergency contact method according to claim 14, wherein the portable computing device activates a camera and sends one or more pictures subsequently taken with the camera when the user presses the send picture button.

19. An apparatus for emergency communications comprising:
   a server storing information regarding a plurality of public safety answering points; and
   a non-transitory computer readable media having stored thereon a mobile application to be executed on a handheld computing device to cause a processor to:
   communicate with the server;
   establish one or more connections via the server with an appropriate one of the plurality of public safety answering points upon activation of an emergency button, wherein said one or more connections include one or more of the following connections: voice, text, image and video;
   enable a user to store private information to share in an emergency situation;
   enable a user to create and store a list of contacts for a customized private social emergency response network with which to send the stored private information in an emergency situation;
   establish on the server, during an emergency situation, a platform via which the user and those listed in the list of contacts for the customized private social emergency response network can share information; and
   send to those on the list of contacts the stored private information during an emergency situation, wherein the mobile application further causes the processor to establish a telephone connection with the public safety access point by determining whether the handheld computing device is located in a domestic location or a foreign location, and:
(i) if the handheld computing device is located in a domestic location, the mobile application causes the processor to display an emergency telephone number and establish a telephone call using the displayed emergency telephone number; or
(ii) if the handheld computing device is located in a foreign location, the mobile application causes the processor to display a local emergency telephone number and a telephone number of an embassy for a user of the handheld computing device and establish a telephone call using the displayed local emergency telephone number and/or the displayed embassy telephone number.

\* \* \* \* \*